(12) United States Patent
Fraas et al.

(10) Patent No.: US 11,685,230 B2
(45) Date of Patent: Jun. 27, 2023

(54) FLAP STOPPER FOR A ROTATABLE FLAP

(71) Applicant: Mahle International GmbH, Stuttgart (DE)

(72) Inventors: Marc Fraas, Bietgheim-Bissingen (DE); Michael Komowski, Weil der Stadt (DE); Holger Laux, Dietingen (DE)

(73) Assignee: Mahle International GmbH

( * ) Notice: Subject to any disclaimer, the term of this patent is extended or adjusted under 35 U.S.C. 154(b) by 102 days.

(21) Appl. No.: 17/367,816

(22) Filed: Jul. 6, 2021

(65) Prior Publication Data

US 2022/0001719 A1 Jan. 6, 2022

(30) Foreign Application Priority Data

Jul. 6, 2020 (DE) .......................... 102020208425.4

(51) Int. Cl.
*B60H 1/00* (2006.01)
*B60H 1/26* (2006.01)
*B60H 1/34* (2006.01)

(52) U.S. Cl.
CPC ..... *B60H 1/00685* (2013.01); *B60H 1/00564* (2013.01); *B60H 1/26* (2013.01); *B60H 2001/00707* (2013.01); *B60H 2001/3471* (2013.01)

(58) Field of Classification Search
CPC ............ B60H 1/00685; B60H 1/00564; B60H 1/00678; B60H 1/26; B60H 2001/00707; B60H 2001/3471; F26K 1/22; F26K 1/32; F26K 1/50
See application file for complete search history.

(56) References Cited

U.S. PATENT DOCUMENTS

| 7,849,684 | B2 * | 12/2010 | Gerards | .................... F16K 1/22 |
| --- | --- | --- | --- | --- |
| | | | | 60/299 |
| 2004/0187920 | A1 | 9/2004 | Schmidt et al. | |
| 2005/0048905 | A1 * | 3/2005 | Yang | .................... B60H 1/3421 |
| | | | | 454/155 |
| 2005/0239391 | A1 * | 10/2005 | Shibata | ................ B60H 1/3421 |
| | | | | 454/155 |
| 2007/0214643 | A1 * | 9/2007 | Nagata | .................... B23F 15/06 |
| | | | | 409/12 |
| 2013/0047968 | A1 | 2/2013 | Hodebourg et al. | |
| 2020/0362969 | A1 * | 11/2020 | Tanaka | .................... F01N 13/08 |

FOREIGN PATENT DOCUMENTS

DE 102006004674 A1 8/2007

OTHER PUBLICATIONS

English abstract for DE-102006004674.

* cited by examiner

*Primary Examiner* — Marc E Norman
(74) *Attorney, Agent, or Firm* — Fishman Stewart PLLC

(57) ABSTRACT

A flap stopper for a rotatable flap for controlling an air flow may include a round bearing support disc, a round stopper support disc, stop elements, and connecting ribs. The stopper support disc may be spaced apart from the bearing support disc in an axial direction. The stop elements may be arranged on the stopper support disc. The connecting ribs may be arranged between the bearing support disc and the stopper support disc. The bearing support disc, the stopper support disc, the stop elements, and the connecting ribs may be formed as an integral plastic injection-molded part.

20 Claims, 3 Drawing Sheets

FLAP STOPPER FOR A ROTATABLE FLAP

CROSS-REFERENCE TO RELATED APPLICATION

This application claims priority to German Application DE 10 2020 208 425.4 filed on Jul. 6, 2020, the contents of which are hereby incorporated by reference in its entirety.

TECHNICAL FIELD

The present invention relates to a flap stopper for a rotatable flap for controlling an air flow. The invention moreover relates to a rotatable flap for controlling an air flow comprising a flap leaf and such a flap stopper. The present invention furthermore relates to an air control device comprising such a flap as well as an air-conditioning system comprising such an air control device.

BACKGROUND

Flap controllers in air-conditioning systems of motor vehicles are well known and often have rotatable flaps, which can be adjusted between a closed and an open position by means of a rotation. However, a direct drive of such a flap by means of an actuator comprising an integrated flap stop can thereby create comparatively high torsional stresses at a flap-side actuator receptacle as well as in the region of a flap stopper. For this reason, so-called intermediate members are often used, which are made of a material, which is more resistant compared to the flaps, for example more resistant plastic, and on which a stop element is arranged. Polypropylene T20/T40, which, given the stability, is too weak in the long run for a flap stopper or stop element, respectively, however, is thereby often used for the flap itself. For this reason, the above-mentioned intermediate member was made of a harder plastic, for example polyamide, whereby even though a higher resistance can be attained, higher costs result as well.

SUMMARY

The present invention thus deals with the problem of specifying a flap stopper, which overcomes the disadvantages known from the prior art. This problem is solved according to the invention by means of the subject matter of independent claim 1. Advantageous embodiments are subject matter of the dependent claims.

The present invention is based on the general idea of forming a flap stopper for a rotatable flap for controlling an air flow comprising two annular disks and at least one stop element arranged therebetween, whereby, solely due to its geometric design, the flap stopper is so stiff that it can also be made of a softer material, for example a plastic, which had only been used to date for a flap leaf. The flap stopper according to the invention thereby has a disk-shaped bearing support plate and a disk-shaped stopper support plate, which is spaced apart therefrom in the axial direction. In the following, the terms "bearing support plate" and "bearing support disc" as well as "stopper support plate" and "stopper support plate" denote the same. Stop elements are arranged on the stopper support plate, usually at least one such stop element, but preferably two. Connecting ribs are furthermore arranged between the bearing support plate and the stopper support plate, wherein the bearing support plate, the stopper support plate, the stop element, and the connecting ribs are formed as integral plastic injection-molded part. Due to the embodiment of the flap stopper according to the invention comprising the two disk-shaped support plates as well as the stop elements and connecting ribs arranged therebetween, it is possible for the first time to make the entire flap stopper of a plastic, which, given the strength, is less resilient, such as, for example, polypropylene, and to not have to make it of a harder plastic, such as, for example, polyamide, as in the past. By using polypropylene, for example, the flap stopper according to the invention can be designed in a significantly more cost-efficient manner than was the case with flap stoppers, which were made of polyamide until now, in particular also in view of process costs, that is, machine and assembly costs. In the case of the flap stopper according to the invention, the actual stop elements only have indirect contact with, for example, a bearing pin or axial extension, respectively, and are in fact held or received, respectively, by the two support plates. If, for example, a torque is thus introduced via an actuator into the bearing pin or into the axial extension, respectively, of a rotatable flap, which is equipped with the flap stopper according to the invention, the torque is initially transmitted to the bearing support plate, and from the latter via the connecting ribs or stop elements, respectively, to the stopper support plate. The forces can be distributed significantly more evenly thereby and the torsional stress as a whole can be reduced. If the flap reaches a stop position, the torque is transmitted from the bearing support plate into the stop elements, but they are not transmitted further from there into the flap leaf, whereby the flap leaf is no longer stressed by the torque, which is introduced by the actuator. Due to the geometry, the stress distribution is thereby distributed evenly. The maximum values lie below the plastic deformation of the material, whereby the flap can also withstand the torques introduced by the actuator in the long term.

In the case of an advantageous further development of the solution according to the invention, the stopper support plate has a larger diameter than the bearing support plate. It is possible thereby to transmit a torque introduction from the smaller bearing support plate via the connecting ribs and the stop elements to the larger stopper support plate, wherein, due to the disk-shaped formation of the bearing support plate as well as of the stopper support plate, these two are able to absorb high torques. A further advantage of this embodiment lies in that the stop elements per se can be arranged radially outside of the bearing support plate, whereby stop forces acting there are significantly smaller due to the lever principle.

In the case of a further advantageous embodiment of the flap stopper according to the invention, the stop elements are connected to a first front side of the stopper support plate facing the bearing support plate, and likewise to a first front side of the bearing support plate facing the stopper support plate, as well as to an outer circumference of the bearing support plate. A particularly torsion-resistant connection of the stop elements to the bearing support plate and to the stopper support plate is possible thereby. In this paragraph as well as in the previous and the following paragraphs, stop elements are thereby often referred to in the plural form, wherein it goes without saying that, purely theoretically, only a single stop element can also be provided and is sufficient.

In the case of an advantageous further development of the solution according to the invention, the flap stopper is made of polypropylene. Polypropylene thereby represents a thermoplastic plastic, which belongs to the group of the polyolefins. Polypropylene is slightly harder than polyethylene and is additionally more heat-resistant. Polypropylene is additionally characterized in that this plastic has a comparatively low density and thus a low weight. Compared to polyamide, which has been used for flap stoppers until now, it is significantly more cost-efficient.

In the case of a further advantageous embodiment of the solution according to the invention, at least one stop element has two U-legs, via which it is connected to the first front side and the outer circumference of the bearing support plate, the first front side of the stopper support plate, as well as a U-web. Due to the U-shape of the at least one stop element, the latter can be formed to be comparatively stiff as well as injection mold-friendly with comparatively low material costs. In addition, a very stiff embodiment of the stop element/stop elements can additionally be created due to the connection of the U-legs to the U-web radially on the outside and to the bearing support plate radially on the inside.

An annular groove for receiving a seal and a first flap bearing, which are formed integrally with the flap stopper, are advantageously provided on a second front side of the bearing support plate located opposite the first front side. Such an annular groove provides for the production of a labyrinth seal and thus of a dense bearing of a flap formed with such a flap stopper, for example a ventilation duct of an air-conditioning system. Due to the specific geometric solution and the integration of a no-contact sealing part (annular groove) instead of a flexible, contact seal, advantages can be attained with regard to the sealing effect without additional sealing elements. The first flap bearing can thereby be formed as slide bearing comprising a slide bearing surface, and can thus provide for a smooth bearing of a flap, which is equipped with this flap stopper.

An axial extension (bearing pin) comprising an external polygon is advantageously provided on a second front side of the bearing support plate located opposite the first front side, for the rotationally fixed connection to an actuator, wherein this axial extension is also preferably formed integrally with the flap stopper. It is possible thereby to also integrate the function of the axial bearing pin into the flap stopper, and to form the flap stopper integrally and thus in a cost-efficient manner with stop elements and bearing pins. A comparatively simple positive connection to the actuator is possible via the external polygon, whereby comparatively high torques can be transmitted easily.

The flap, the flap stopper, and the axial extension (bearing pin) can be made integrally and in particular of polypropylene (PP). In addition, the flap leaf, the second flap bearing, the reinforcing ribs, etc., can also be formed as integral plastic part made of polypropylene.

The present invention is further based on the general idea of specifying a rotatable flap for controlling an air flow, which has a flap leaf as well as a flap stopper, which is described in the previous paragraphs, wherein the flap leaf and the flap stopper are formed as integral plastic injection-molded part. In the case of an embodiment of this type of the flap according to the invention, the large advantage is to integrate the flap stopper into an injection molding process for producing the flap, so that the flap stopper does not have to be produced in a separate manufacturing step and has to be assembled subsequently, as before. It is in particular also possible in a multicomponent injection molding process to use a different plastic for the flap stopper than for the flap leaf, and to thus produce a rotatable flap comprising flap leaf and flap stopper of different plastics in a comparatively simple manner.

In the case of an advantageous further development of the flap according to the invention, a second flap bearing, which is formed integrally with the flap leaf and the flap stopper, is provided on a side of the flap leaf located opposite the flap stopper. A particularly cost-efficient and simultaneously simple technical production of such a flap is possible thereby.

Advantageously, reinforcing ribs, which run perpendicular to an axis of rotation of the flap and which are connected to the flap stopper via reinforcing ribs running parallel to said flap stopper, are provided on the flap leaf. It is possible thereby to transfer a reinforcing effect from the flap stopper via the reinforcing ribs into the flap leaf, so that the latter is formed to be comparatively torsion-resistant and is thus held reliably in its position even in response to high pressures in the respective ventilation duct.

The present invention is further based on the general idea of specifying an air control device for an air-conditioning system comprising at least one such flap for controlling an air flow, and to thus transfer the above-mentioned and described advantages to the air control device. Concretely, this is in particular a cost-efficient production of a flap comprising an integrated flap stopper of plastic, which is comparatively cost-efficient and which is less resilient, such as, for example polypropylene.

The present invention is additionally based on the general idea of using an air control device of this type in an air-conditioning system for a vehicle, in particular a motor vehicle, for air-conditioning a vehicle interior, and to thus also transfer the attained cost advantages to the air-conditioning system.

Further important features and advantages of the invention follow from the subclaims, from the drawings, and from the corresponding figure description on the basis of the drawings.

t goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
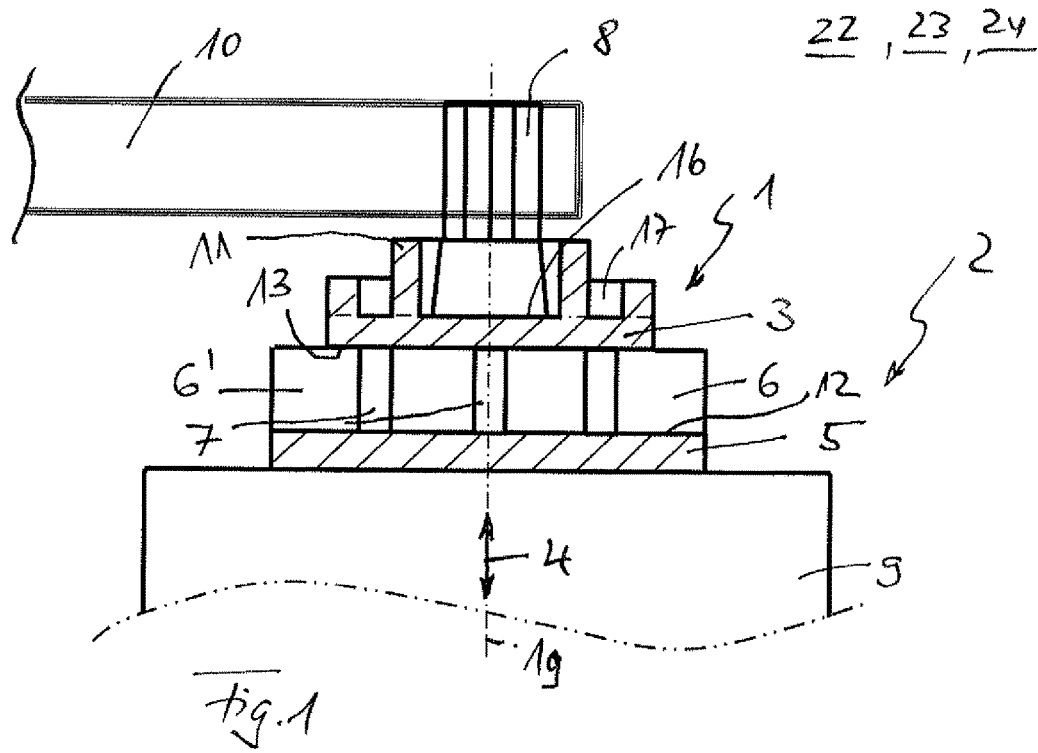
FIG. 1 shows a sectional illustration through a flap stopper according to the invention comprising a flap leaf arranged thereon and a connected actuator.

According to FIGS. 1 to 5, a flap stopper 1 according to the invention for a rotatable flap 2 for controlling an air flow has a disk-shaped bearing support plate 3 and a disk-shaped stopper support plate 5, which is spaced apart therefrom in the axial direction 4. Two stop elements 6, 6' are thereby arranged on the stopper support plate 5, wherein connecting ribs 7 are additionally arranged or run, respectively, between the bearing support plate 3 and the stopper support plate 5. According to the invention, the bearing support plate 3, the stopper support plate 5, the stop elements 6, 6', as well as the connecting ribs 7 are now formed as integral plastic injection-molded part, in particular even of the same plastic. By means of the bearing support plate 3 and the stopper support plate 5, it is possible due to the disk-shaped design thereof, to introduce comparatively high torques via the stop elements 6, 6' into an axial extension 8, and to thereby simultaneously provide for a formation of the stop elements 6, 6' of a less resilient plastic, for example of polypropylene. Up to now, flap stoppers of this type were made of significantly harder or more resistant plastic, respectively, for example of polyamide, but which was associated with significantly higher costs.

y means of the two support plates 3, 5 it is furthermore possible not to transmit a torque, which is introduced by an actuator 10 (see FIG. 1) into the axial extension 8 in the stop position, in which the highest torques occur, onto the flap 2 as a whole, but onto the flap stopper 1. As a whole, this then has a positive impact on the torsional stress of the flap 2, because the flap leaf 9 is then, for example, no longer stressed by the torque introduced by the actuator 1, but said torque is absorbed by the flap stopper 1. In the event of movement, the torque can be transmitted easily to the actual flap leaf due to the geometries, whereby the stop case is always the focus of the design.

When further looking at the support plates 3, 5, it can be seen that the stopper support plate 5 has a larger diameter than the bearing support plate 3, whereby in particular the arranging of stop elements 6, 6' is possible farther on the outside, which provides for a larger torque absorption due to the lever principle. In addition, it is thus possible that corresponding counter stop elements, which, when reaching a predefined end stop, cooperates with at least one stop element 6, 6', are arranged on a housing wall.

The stop elements 6, 6' are connected to a first front side 12 of the stopper support plate 5 facing the bearing support plate 3. In addition, the stop elements 6 are a connected to a first front side 13 of the bearing support plate 3 facing stopper support plate 5, as well as to an outer circumference of the bearing support plate 3. An axial embedding of the stop elements 6, 6' between the two support plate 3, 5 as well as additional an outer connection to the bearing support plate 3 is made possible thereby.

When further looking at FIGS. 1 to 5, it can be seen that the flap stopper 1 according to the invention has two stop elements 6, 6' located opposite one another, whereby it goes without saying that only a single stop element 6 is conceivable as well.

When looking at the stop elements 6, 6' in more detail, it can be seen that they each have two U-legs 14, via which they are connected to the first front side 12 of the stopper support plate 5 as well as to the first front side 13 and the outer circumference of the bearing support plate 3 and a U-web 15. An injection molding tool-friendly as well as comparatively stiff formation of the stop elements 6, 6' while simultaneously using little material and thus low weight and low costs is possible via the U-shape. When looking at the U-web 15, it can be seen, in particular from FIGS. 2 to 5, that said U-web is flush with the outer circumference of the stopper support plate 5.

An annular groove 17 for receiving a non-illustrated seal as well as a first flap bearing 11, which serves as bearing point for bearing the flap 2, is provided on a second front side 16 of the bearing support plate 3 located opposite the first front side 13. The annular groove 17 and the first flap bearing 11 or the bearing point, respectively, are thereby preferably likewise formed integrally with the flap stopper 1, and can thus be produced in a technically simple and cost-efficient plastic injection molding process, together with said flap stopper. The above-described axial extension 8 comprising an external polygon, via which a rotationally fixed connection to the actuator 10 is made possible, is additionally arranged on the second front side 16 of the bearing support plate 3 located opposite the first front side 13. The axial extension 8 is preferably also formed integrally with the flap stopper 1 and can thus likewise be produced in a technically simple and cost-efficient manner in a single plastic injection molding process, together with said flap stopper.

In a next larger step, it is also conceivable that the flap 2 is produced in a common plastic injection molding process, together with the flap stopper 1, wherein a different plastic, for example, can be used for the flap stopper 1, so that the flap 2 produced in this way represents a multicomponent plastic injection-molded part. For example, the flap leaf 9 is injection-molded to the flap stopper 1 in this case.

Figure 2:
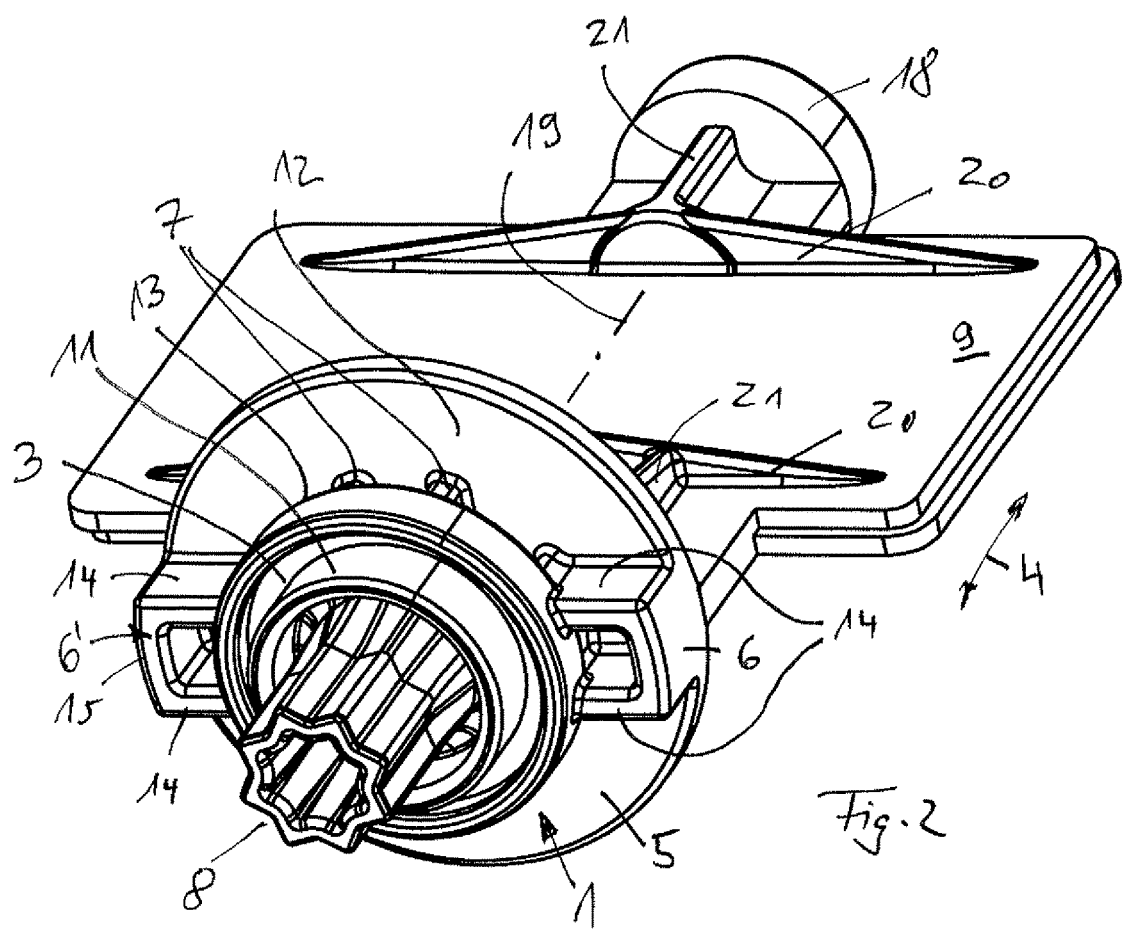
FIG. 2 shows a flap according to the invention comprising a flap stopper.
Figure 3:
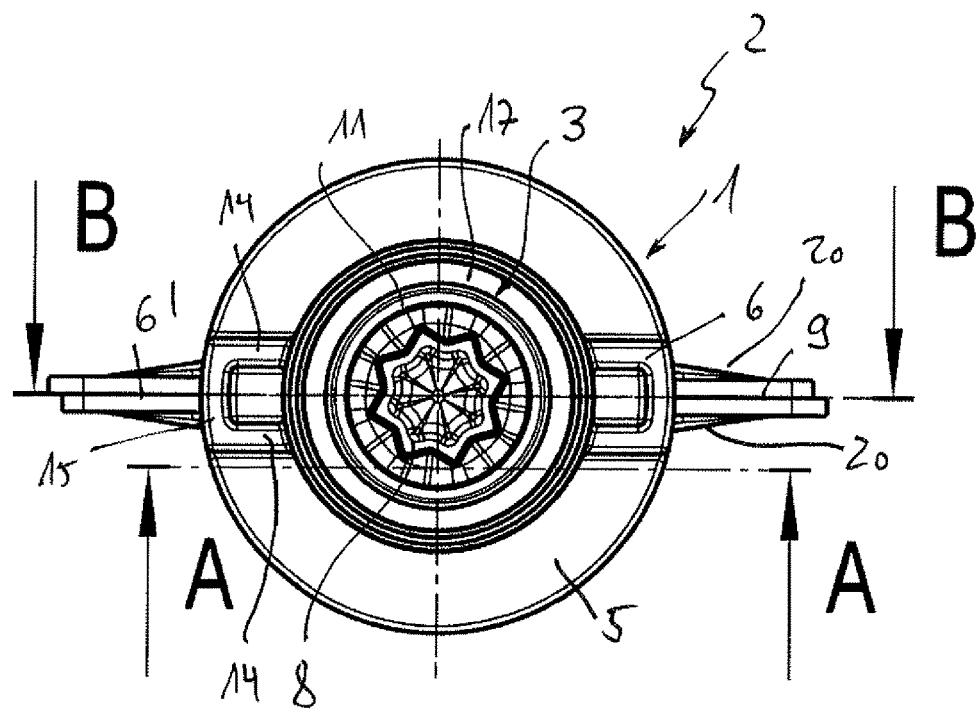
FIG. 3 shows a front view onto the flap according to the invention.
Figure 4:
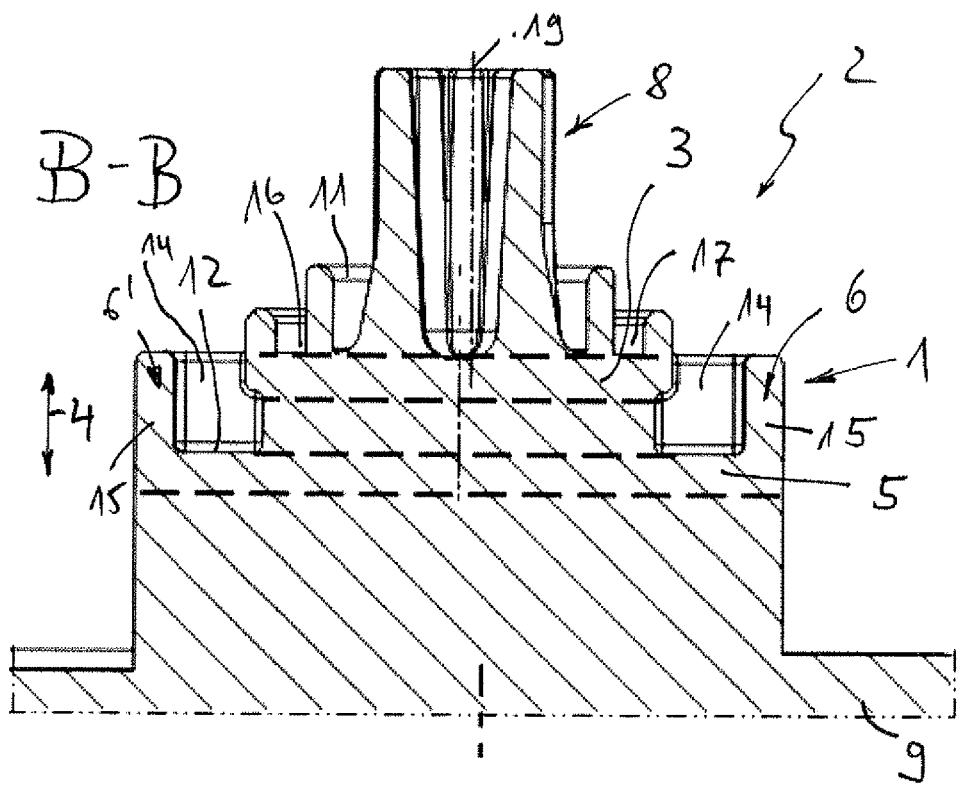
FIG. 4 shows a sectional illustration along the sectional plane B-B through the flap stopper or the flap, respectively.
Figure 5:
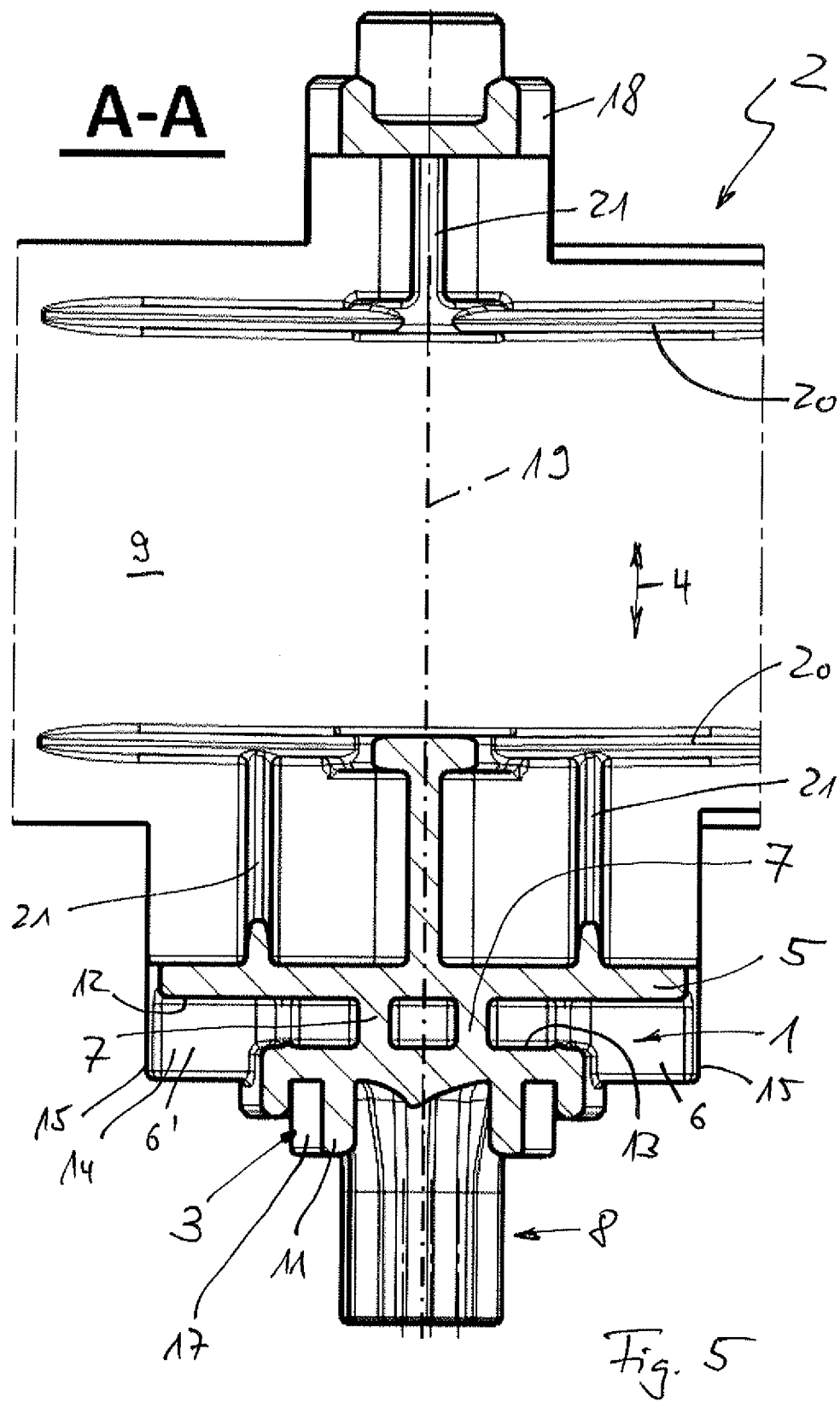
FIG. 5 shows a sectional illustration through the flap along the sectional plane A-A.

A second flap bearing 18 (see in particular FIGS. 2 and 5), which is preferably likewise formed integrally with the flap leaf 9 and the flap stopper 1, is provided on a side of the flap leaf 9 located opposite the flap stopper 1, so that the flap 2, which is illustrated according to FIG. 2 and according to FIG. 5, is preferably produced completely integrally. In this case, integrally does not have to mean that the same plastic is used for the flap stopper 1 or the second flap bearing 18, respectively, and/or the flap leaf 9, which may be the case, but other plastic can also be used for the flap stopper 1 or the second flap bearing 18, respectively.

When looking at FIGS. 2 and 5, it can be seen that reinforcing ribs 20, which run perpendicular to an axis of rotation 19 of the flap 2 and which are connected to the flap stopper 1 via reinforcing ribs 21 running parallel to the axis of rotation 19 to said flap stopper, are provided on the flap plates 9. A high torque introduction from the flap leaf 9 into the flap stopper 1 or the second flap bearing 18, respectively, and vice versa is possible thereby, whereby a comparatively torsion-resistant flap leaf 9 with simultaneously low weight can be attained.

The flap 2 according to the invention or the flap stopper 1 according to the invention, respectively, is used in an air control device 22 for an air-conditioning system 23, for example in a vehicle 24, in particular a motor vehicle.

In particular a significantly improved torque introduction from the axial extension 8 into the flap 2 can be attained by means of the flap 2 according to the invention and the flap stopper 1 according to the invention, whereby the torsional stress of the flap 2 and thus also a risk of material fatigue can be reduced significantly. The two support plates 3, 5 thereby play the important role, because they do not transmit a torque, which is introduced by the actuator 10 into the axial extension 8 in the stop position, in which the highest torques occur, onto the flap 2 as a whole, but onto the flap stopper 1, whereby the flap leaf 9 is no longer stressed by the torque, which is introduced by the actuator 1.

An annular seal, which has already proven itself so far, can furthermore be used due to the placement of the bearing support plate 3 directly at the first flap bearing 11 or the first bearing point 11, respectively.

The invention claimed is:

1. A flap stopper for a rotatable flap for controlling an air flow, comprising:
   a round bearing support disc;
   a round stopper support disc spaced apart from the bearing support disc in an axial direction;
   stop elements arranged on the stopper support disc; and connecting ribs arranged between the bearing support disc and the stopper support disc,
   wherein the bearing support disc, the stopper support disc, the stop elements, and the connecting ribs are formed as an integral plastic injection-molded part.

2. The flap stopper according to claim 1, wherein the stopper support disc has a larger diameter than the bearing support disc.

3. The flap stopper according to claim 1, wherein the stop elements are connected to a first front side of the stopper support disc facing the bearing support disc.

4. The flap stopper according to claim 1, wherein the flap stopper is made of a thermoplastic plastic.

5. The flap stopper according to claim 1, wherein the flap stopper has two stop elements located opposite one another.

6. The flap stopper according to claim 5, wherein at least one stop element has two U-legs connected to a first front side and an outer circumference of the bearing support disc, a first front side of the stopper support disc, and a U-web.

7. The flap stopper according to claim 6, the U-web is flush with an outer circumference of the stopper support disc.

8. The flap stopper according to claim 6, wherein an annular groove for receiving a seal and a first flap bearing that are formed integrally with the flap stopper are provided on a second front side of the bearing support disc located opposite the first front side.

9. The flap stopper according to claim 8, wherein an axial extension comprising an external polygon is provided on the second front side of the bearing support disc for a rotationally fixed connection to an actuator.

10. The flap stopper according to claim 9, wherein the axial extension is formed integrally with the flap stopper.

11. The flap stopper according to claim 1, wherein the stop elements are connected to a first front side of the bearing support disc facing the stopper support disc and to an outer circumference of the bearing support disc.

12. The flap stopper according to claim 1, wherein the flap stopper is made of polypropylene.

13. A rotatable flap for controlling an air flow comprising a flap leaf and a flap stopper according to claim 1.

14. The rotatable flap according to claim 13, wherein a second flap bearing that is formed integrally with the flap leaf and the flap stopper is provided on a side of the flap leaf located opposite the flap stopper.

15. The rotatable flap according to claim 13, wherein reinforcing ribs are provided on the flap leaf.

16. The rotatable flap according to claim 15, wherein the reinforcing ribs extend perpendicular to an axis of rotation of the flap.

17. The rotatable flap according to claim 16, wherein the reinforcing ribs are connected to the flap stopper via reinforcing ribs that extend parallel to the axis of rotation.

18. The rotatable flap according to claim 13, wherein the flap leaf and the flap stopper are formed as an integral plastic injection-molded part.

19. An air control device for an air-conditioning system comprising a rotatable flap according to claim 13 for controlling an air flow.

20. An air-conditioning system for a vehicle for air-conditioning a vehicle interior, comprising at least one air control device according to claim 19.

* * * * *